(12) United States Patent  
Herbst-Dederichs et al.

(10) Patent No.: US 9,404,578 B2  
(45) Date of Patent: Aug. 2, 2016

(54) PISTON RING WITH CHROMIUM SOLID PARTICLE WEAR-PREVENTION LAYER AND CORROSION-RESISTANT FLANK SURFACE

(71) Applicant: Federal-Mogul Burscheid GmbH, Burscheid (DE)

(72) Inventors: Christian Herbst-Dederichs, Bornheim (DE); Waldemar Urbatzka, Burscheid (DE); Stefan Duerdoth, Burscheid (DE); Peter-Klaus Esser, Kuerten (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 52 days.

(21) Appl. No.: 14/385,327

(22) PCT Filed: Dec. 7, 2012

(86) PCT No.: PCT/EP2012/074839  
§ 371 (c)(1),  
(2) Date: Sep. 15, 2014

(87) PCT Pub. No.: WO2013/135325  
PCT Pub. Date: Sep. 19, 2013

(65) Prior Publication Data  
US 2015/0054222 A1 Feb. 26, 2015

(51) Int. Cl.  
*F16J 9/26* (2006.01)  
*C23C 8/26* (2006.01)  
(Continued)

(52) U.S. Cl.  
CPC ... *F16J 9/26* (2013.01); *C23C 8/04* (2013.01); *C23C 8/28* (2013.01); *C23C 8/34* (2013.01);  
(Continued)

(58) Field of Classification Search  
CPC .................. F16J 9/00; F16J 9/26; C23C 8/04; C23C 8/38; C23C 8/34; C23C 8/80  
See application file for complete search history.

(56) References Cited

U.S. PATENT DOCUMENTS

| 4,846,940 A | 7/1989 | Neuhäuser et al. |
| 5,154,433 A | 10/1992 | Naruse |

(Continued)

FOREIGN PATENT DOCUMENTS

| DE | 3506746 A1 | 9/1985 |
| DE | 3531410 A1 | 3/1987 |

(Continued)

OTHER PUBLICATIONS

International Search Report with translation, cited in PCT/EP2012/074839, Dated Jan. 28, 2013, 4 Pgs.

(Continued)

*Primary Examiner* — Gilbert Lee  
(74) *Attorney, Agent, or Firm* — Patterson Thuente Pedersen, P.A.

(57) ABSTRACT

A coated piston ring having a base body of chromium steel with more than 10 wt.-% chromium and having an inner circumferential surface, a first flank surface, a second flank surface and an outer circumferential surface. The first flank surface comprises a nitride diffusion layer with a layer thickness of from 5-300 μm, a nitride connecting layer with a layer thickness of from 0.5-15 μm on the nitride diffusion layer, and an oxide layer with a layer thickness of from 0.05-3 μm on the nitride connecting layer. The second flank surface comprises the nitride diffusion layer, and the outer circumferential surface comprises the nitride diffusion layer and a chromium solid particle layer with 0.1-30 vol.-% solid particles, relative to the total volume of the chromium solid particle layer on the nitride diffusion layer.

16 Claims, 3 Drawing Sheets

(51) Int. Cl.
*C23C 8/80* (2006.01)
*C23C 8/34* (2006.01)
*C23C 8/04* (2006.01)
*C23C 8/28* (2006.01)
*C23C 28/00* (2006.01)
*C25D 5/02* (2006.01)
*C25D 5/48* (2006.01)
*C25D 7/04* (2006.01)

(52) U.S. Cl.
CPC ............... *C23C 8/80* (2013.01); *C23C 28/322* (2013.01); *C23C 28/345* (2013.01); *C25D 5/02* (2013.01); *C25D 5/48* (2013.01); *C25D 7/04* (2013.01)

(56) References Cited

U.S. PATENT DOCUMENTS

| | | | | |
|---|---|---|---|---|
| 6,224,687 | B1 * | 5/2001 | Inoue | ............ C23C 8/26 148/318 |
| 6,503,642 | B1 | 1/2003 | Linde | |
| 8,597,797 | B2 * | 12/2013 | Sekiya | ............ C23C 14/0036 277/434 |
| 9,181,870 | B2 * | 11/2015 | Da Rocha Mordente | ............ C23C 14/0641 |
| 2002/0117808 | A1 | 8/2002 | Ogawa et al. | |
| 2002/0180157 | A1 | 12/2002 | Horn et al. | |
| 2007/0252338 | A1 | 11/2007 | Maier et al. | |
| 2008/0256794 | A1 | 10/2008 | Maier | |
| 2011/0115167 | A1 | 5/2011 | Linde et al. | |

FOREIGN PATENT DOCUMENTS

| | | |
|---|---|---|
| DE | 199410022 A1 | 3/2000 |
| DE | 10207148 A1 | 9/2002 |
| DE | 10127020 A1 | 12/2002 |
| DE | 102004028487 A1 | 1/2006 |
| DE | 102005041408 A1 | 3/2007 |
| DE | 102006003480 B3 | 7/2007 |
| DE | 102007038188 A1 | 2/2009 |
| DE | 102008017270 B3 | 6/2009 |
| EP | 0217126 A1 | 4/1987 |
| EP | 0605223 A1 | 7/1994 |
| EP | 0841414 A1 | 5/1998 |
| GB | 2155588 A | 9/1985 |
| WO | WO 01/04386 A1 | 1/2001 |
| WO | WO 03/098079 A1 | 11/2003 |
| WO | WO 2009/121443 A1 | 10/2009 |

OTHER PUBLICATIONS

Translation of International Preliminary Report on Patentability for PCT/EP2012/074839, mailed Sep. 25, 2014, 8 pages.

* cited by examiner

PISTON RING WITH CHROMIUM SOLID PARTICLE WEAR-PREVENTION LAYER AND CORROSION-RESISTANT FLANK SURFACE

RELATED APPLICATIONS

The present application is a National Phase entry of PCT Application No. PCT/EP2012/074839, filed Dec. 7, 2012, which claims priority from DE Application No. 102012204156.7, filed Mar. 16, 2012, said applications being hereby fully incorporated herein by reference in their entirety.

FIELD OF THE INVENTION

The invention relates to a piston ring, the first flank surface of which has a nitride diffusion layer and, arranged above this, a nitride connecting layer and an oxide layer, and the second flank surface of which has a nitride diffusion layer, and the outer circumferential surface of which has a nitride diffusion layer and, above this, a chromium solid particle layer as a wear-prevention layer.

BACKGROUND OF THE INVENTION

In internal combustion engines which work on the piston engine principle, the sliding movement of the piston and of the piston rings, located in the piston grooves, which ensure that the system is sealed in such a way that the gases from combustion do not get past the piston into the crankcase, leads to wear of the friction partners involved. These are mainly the cylinder and the piston rings which slide on it.

In particular, the first piston ring positioned closest to the combustion chamber is subjected to very high thermal load stresses and combustion pressures. Above all, this leads to an increased corrosion and an increased wear on the flank surface, facing towards the combustion chamber, of the first piston ring. A further problem for the first piston ring is that this ring must run under the worst lubrication conditions. In order to meet these extreme requirements, the flank surfaces can be hardened for an increased wear resistance. Wear-prevention coatings, for example of hard chromium, can be applied to the outer circumferential surface of piston rings, which functions as a running surface.

A piston ring is described in DE 10 2005 041 408 A1, the surface of which is provided with a hardened layer, wherein a nitriding or chrome nitriding process can be used for the hardening, and to the flank surfaces or the outer circumferential surface of which a wear-prevention layer can be applied.

Such piston rings have an increased hardness on the nitrided flank surfaces. Nitrided surfaces, however, have the disadvantage of only a low corrosion resistance, because an oxide protection layer can no longer form in a natural way due to the bonding of the passivating elements. The corrosion resistance of the upper flank surface and the wear resistance of the outer circumferential surface of such piston rings are therefore still in need of improvement.

SUMMARY OF THE INVENTION

The object of the present invention is therefore to provide a piston ring having a highly wear-resistant outer circumferential surface and a flank surface that simultaneously has a high hardness and a high corrosion resistance.

This object is achieved according to the invention by a piston ring with a base body of chromium steel with more than 10 wt.-% chromium which has an inner circumferential surface, a first flank surface, a second flank surface and an outer circumferential surface, wherein the first flank surface comprises a nitride diffusion layer with a layer thickness of from 5-300 μm, a nitride connecting layer arranged directly above this with a layer thickness of from 0.5-15 μm and an oxide layer arranged directly above this with a layer thickness of from 0.05-3 μm, the second flank surface comprises the nitride diffusion layer, and the outer circumferential surface comprises the nitride diffusion layer and a chromium solid particle layer arranged above this with 0.1-30 vol.-% solid particles, relative to the total volume of the chromium solid particle layer.

The object is further achieved by a method for producing a piston ring, comprising the steps in which a metallic base body of a piston ring which has an inner circumferential surface, a first flank surface, a second flank surface and an outer circumferential surface (a) is heated to at least 300° C. in a combined nitriding-oxidation process under an atmosphere containing at least one nitrogen compound, then air is added to it and the piston ring is cooled in the presence of the air, whereby a nitride diffusion layer, a nitride connecting layer arranged above this and an oxide layer arranged above this are produced on at least the first flank surface, the second flank surface and the outer circumferential surface, and (b) the piston ring is then introduced into an aqueous electrolyte which contains chromium in ion form and solid particles, and a chromium solid particle layer is deposited electrochemically onto at least the outer circumferential surface.

The multi-layer structure of the first flank surface of nitride diffusion layer, nitride connecting layer and oxide layer surprisingly has a very high corrosion resistance, wherein the hardness of the surface, which is produced by the nitride layers, is preserved.

By a nitride diffusion layer within the meaning of the invention is meant a layer which comprises iron nitrides, chromium nitrides and/or iron—chromium nitrides which are embedded in the chromium steel of the base body. By a nitride connecting layer within the meaning of the invention is meant a layer with ≥90 wt.-% iron nitrides, chromium nitrides and/or iron—chromium nitrides, relative to the total weight of the nitride connecting layer. By an oxide layer within the meaning of the invention is meant a layer with ≥90 wt.-% iron oxides, chromium oxides and iron—chromium oxides, relative to the total weight of the oxide layer.

Examples of iron nitrides are $Fe_4N$, $FeN$, $Fe_2N_3$ and $Fe_2N$. Examples of chromium nitrides are $CrN$ and $Cr_2N$ and examples of iron—chromium nitrides are $Fe_4CrN$ and $FeCr_2N_3$. Examples of iron and chromium oxides are in particular $Fe_2O_3$, $Fe_3O_4$ as well as $Cr_2O_3$ and $Cr_3O_4$.

The base body of the piston ring according to the invention comprises chromium steel with more than 10 wt.-% chromium, preferably 11-20 wt.-% chromium, relative to the total mass of the base body. Martensitic chromium steel is preferred.

The nitride diffusion layer and the nitride connecting layer, which are produced in the nitriding step of the combined nitriding-oxidation process, comprise iron, chromium and/or iron—chromium nitrides which form from the constituents iron and chromium of the chromium steel due to the reaction of nitrogen-containing compounds in the nitriding step. While the nitride connecting layer consists substantially of iron, chromium and/or iron—chromium nitrides, the nitride diffusion layer still consists substantially of the chromium steel of the base body in which the iron nitrides, chromium nitrides and/or iron—chromium nitrides are embedded. During the nitriding process, the nitrogen-containing compounds diffuse into the chromium steel and form iron, chromium and/or iron—chromium nitrides there.

As a rule, the concentration of the iron, chromium and/or iron—chromium nitrides in the nitride diffusion layer is in total in the range of from approximately 0.1-5 wt.-%, relative to the total weight of the nitride diffusion layer. Furthermore, the concentration of the iron, chromium and/or iron—chromium nitrides in the nitride diffusion layer increases from inside to outside as a rule, preferably from approximately $10^{-5}$-$10^{-3}$ wt.-% to approximately 1-15 wt.-%. In the nitride connecting layer arranged above the nitride diffusion layer, the concentration of the iron, chromium and/or iron—chromium nitrides is markedly higher and lies at ≥90 wt.-%, preferably ≥95 wt.-%, relative to the total weight of the nitride connecting layer. The nitride diffusion layer and the nitride connecting layer can contain further nitrides which form from further constituents of the chromium steel, e.g. alloy constituents.

In the oxidation step of the combined nitriding-oxidation process, oxides form from the nitrides, and the oxide layer thus comprises ≥90 wt.-% iron oxides, chromium oxides and iron—chromium oxides, preferably ≥95 wt.-% iron oxides, chromium oxides and iron—chromium oxides, relative to the total weight of the oxide layer.

The layer thickness of the nitride diffusion layer is 5-300 µm, preferably 10-200 µm, in particular 20-150 µm. The layer thickness of the nitride connecting layer is 0.5-15 µm, preferably 1-10 µm, in particular 2-8 µm and the layer thickness of the oxide layer is 0.05-3 µm, preferably 0.1-2 µm, in particular 0.2-1.5 µm.

The first flank surface of the piston ring according to the invention, which preferably functions as an upper flank surface, i.e. facing towards the combustion chamber, has a three-layer structure, comprising the above-described nitride diffusion layer, the nitride connecting layer arranged directly above this and the oxide layer arranged directly above this. The oxide layer is responsible for the high corrosion resistance of the first flank surface.

The second flank surface, which in operation preferably functions as the flank surface facing away from the combustion chamber, comprises the nitride diffusion layer and can have the further layer structure of the first flank surface. However, the second flank surface preferably does not comprise an oxide layer and further preferably comprises a nitride connecting layer with a lower layer thickness, in particular a nitride connecting layer with a layer thickness ≤1 µm, or does not comprise a nitride connecting layer. This is likewise preferred for the outer circumferential surface. These preferred embodiments can be produced by mechanically removing the oxide layer again and optionally also the nitride connecting layer after the nitriding-oxidation process, e.g. by grinding. In this way, a low roughness of the second flank surface can be additionally achieved and this has the advantage that the second flank surface displays lower coefficients of friction and thus a lower wear in operation, whereas the high corrosion resistance is not necessary for the second flank surface.

The average peak-to-valley height of the second flank surface, at least in partial areas, is preferably ≤2 µm, in particular ≤1.5 µm. The average peak-to-valley height according to DIN EN ISO 4287:1998 describes the roughness. As a rule, the average peak-to-valley height of the first flank surface, i.e. the uppermost oxide layer, is ≥2 µm, in particular ≥2.5 µm, particularly preferably ≥3 µm. It is further preferred that the ratio of the average peak-to-valley height of the first flank surface to that of the second flank surface is ≥1.5:1, in particular ≥2:1.

On the outer circumferential surface of the piston ring according to the invention a chromium solid particle layer with 0.1-30 vol.-% solid particles, which serves as a wear-prevention layer, is applied to the nitride diffusion layer. Layers as described for example in DE 35 31 410 A1 and EP 0 217 126 A1 in which the chromium layer has a network of cracks and in the cracks of which solids particles are embedded are suitable as chromium solid particle layer. A structured chromium solid particle layer such as described for example in WO 2009/121443 A1 is further preferred.

Preferred solid particles are those of tungsten carbide, chromium carbide, aluminium oxide, silicon carbide, silicon nitride, boron carbide, cubic boron nitride and/or diamond. Advantageous properties can be achieved in particular by diamond particles embedded in the cracks of such an electrochemically deposited chromium layer, in particular diamond particles with a size in the range of from 0.25-0.4 µm, determined by sieving, as described for example in WO 2001/004386 A1 and EP 1 114 209 B1.

The particle size of the solid particles is preferably in the range of from 0.01 to 10 µm, in particular in the range of from 0.1-5 µm, and the particle size is most preferably 0.2-2 µm. The given particle sizes relate to the diameter, determined by sieving. The proportion of solid particles in the chromium solid particle layer is preferably 0.2-10 vol.-%, in particular 0.3-8 vol.-%, relative to the total volume of the chromium solid particle layer.

The thickness of the chromium solid particle layer is preferably ≥40 µm, in particular 50-100 µm. The outer circumferential surface preferably does not have an oxide layer and particularly preferably does not have an oxide layer and has a nitride connecting layer with a markedly lower layer thickness, in particular a nitride connecting layer with a layer thickness ≤1 µm or does not have a nitride connecting layer. A better hold of the chromium solid particle layer is thereby achieved. As in the case of the second flank surface, the oxide layer and the nitride connecting layer can be removed mechanically.

In a further embodiment, the outer circumferential surface and the first flank surface as well as the outer circumferential surface and the second flank surface in each case form a circumferential external edge with an abrasion of from 0.05-0.5 mm and the piston ring comprises the nitride diffusion layer on the circumferential external edges. It is preferred that the piston ring on the circumferential external edges has, at least in partial areas, a chromium solid particle layer arranged above the nitride diffusion layer, and a chromium layer which does not contain any solid particles and is arranged directly above this, likewise at least in partial areas of the circumferential external edge. The areas of the circumferential external edges can, just as in the case of the outer circumferential surface, additionally have a nitride connecting layer, independently of each other, at least in parts. During production, this occurs in particular when, in the method according to the invention, the nitride connecting layer is not completely removed again in the area of the external edges and the running surface, for example is not completely ground off.

By a circumferential external edge or an external edge in this sense is meant an external edge according to DIN ISO 13715, wherein an abrasion according to this standard is the deviation lying inside the ideal geometrical shape. In this preferred embodiment, the abrasion is 0.05-0.5 mm, in particular 0.1-0.2 mm. The abrasion can be for example a rounding or a chamfer.

As a rule, coatings in the area of the external edges are carried out together with the outer circumferential surface, for example by stacking several piston rings one on top of the other and then coating them electrochemically. The layer structure of the external edge, comprising the above-described nitride diffusion layer, the chromium solid particle layer applied at least in partial areas of the external edge, and the chromium layer which does not contain any solid particles and is arranged directly on the chromium solid particle layer and applied at least in partial areas of the external edge, has the advantages of the coating of the running surface. The edge area of piston rings, however, additionally has a tendency towards an increased wear as a consequence of crack formations in the coating, which also occur in the edge area in chromium solid particle layers. These crack formations can be prevented by the additional solid particle-free chromium layer in the edge area applied to the chromium solid particle layer. The layer thickness of the chromium layer which does not contain any solid particles is preferably 10-100 μm, in particular 30-80 μm Such a piston ring can be produced in that, after the nitriding-oxidation process and the electrochemical deposition of the chromium solid particle layer on the outer circumferential surface, including the circumferential external edges between flank surfaces and outer circumferential surface, the piston ring is introduced into an aqueous electrolyte which contains chromium in ion form and does not contain any solid particles, and a chromium layer, in particular a hard chromium layer, which does not contain any solid particles is deposited electrochemically onto the outer circumferential surface and onto the area of the circumferential external edges.

Furthermore, it is preferred according to the invention that on the running surface the chromium layer which does not contain any solid particles is at least partially removed again, for example mechanically. In this manner it is achieved that the running surface carries the particularly wear-resistant chromium solid particle layer directly on the surface, and in the edge area chips are prevented by the additional chromium layer without solid particles.

Thus, in an advantageous embodiment of the piston ring according to the invention, the first flank surface has the above-described nitride diffusion layer, the nitride connecting layer arranged directly above this and the oxide layer arranged directly above this, the second flank surface has the nitride diffusion layer, optionally a nitride connecting layer arranged above this and does not have an oxide layer, and the outer circumferential surface has the nitride diffusion layer, optionally a nitride connecting layer arranged above this, and a chromium solid particle layer arranged directly above this. A layer structure of nitride diffusion layer, optionally nitride connecting layer, chromium solid particle layer and solid particle-free chromium layer is further preferred in the edge area. Just as in the case of the outer circumferential surface and second flank surface, the edge area preferably does not have an oxide layer and particularly preferably does not have a nitride connecting layer.

The layer structure according to the invention is suitable in particular for so-called trapezoidal piston rings, as trapezoidal piston rings are frequently used as first piston ring in diesel engines in order to avoid seizing up due to residues of combustion and in such diesel engines a particularly high corrosion resistance of the flank surface, facing towards the combustion chamber, of the first piston ring is desirable due to the high combustion pressures. It is therefore preferred that the first flank surface and the second flank surface of the base body in each case have a ring-shaped bevelled surface, wherein the ring-shaped bevelled surface is in each case connected to the inner circumferential surface, wherein the ring-shaped bevelled surfaces in each case make up at least 70% of the flank surface, and the internal angles α and β between the inner circumferential surface of the base body and the bevelled surface in each case are 92°-115°, preferably 95°-110°, particularly preferably 97°-100°. It is preferred that the bevelled surface in each case makes up at least 80% of the flank surface.

In a further preferred embodiment, only a part of the flank surfaces is bevelled, with the result that a non-bevelled, ring-shaped part of the flank surface remains, which is also described as a facet. The ring-shaped bevelled surface of the flank surface preferably makes up 70-95%, particularly preferably 75-92%, in particular 80-90% of the respective flank surface. The non-bevelled, ring-shaped surface is preferably 5-30%, particularly preferably 8-25%, in particular 10-20% of the respective flank surface. In this embodiment it is further preferred that at least one of the non-bevelled ring-shaped surfaces does not have an oxide layer and does not have a nitride connecting layer. It can also be the case that both non-bevelled ring-shaped surfaces do not have an oxide layer and do not have a nitride connecting layer. It is further preferred that at least one of the non-bevelled ring-shaped surfaces has a nitride diffusion layer with a layer thickness <5 μm or does not have a nitride diffusion layer.

Such a piston ring has the advantages of the three-layer structure of nitride diffusion layer, nitride connecting layer and oxide layer precisely where the combination of high hardness and high corrosion resistance is desirable, because essentially only the bevelled surfaces of a trapezoidal ring are in contact with the groove of the piston and precisely here the high hardness and corrosion resistance improve the properties of the piston ring. Due to the lack of oxide layer and nitride connecting layer in the area of the non-bevelled surfaces, this piston ring has the further advantage that it can be chrome-plated later more efficiently because, due to the lack of oxide layer and nitride connecting layer, the conductive connection is better there.

A preferred embodiment thus relates to a piston ring with a base body, which has an inner circumferential surface, a first flank surface, a second flank surface and an outer circumferential surface, wherein the first flank surface and the second flank surface in each case have a ring-shaped bevelled surface which in each case is connected to the inner circumferential surface and in each case makes up 70-95% of the flank surface, and the internal angles α and β between the inner circumferential surface of the base body and the ring-shaped bevelled surface in each case independently of each other are 92°-115°, and the piston ring has non-bevelled ring-shaped surfaces, wherein the ring-shaped, bevelled surfaces comprise a nitride diffusion layer with a layer thickness of from 5-300 μm, a nitride connecting layer arranged directly above this with a layer thickness of from 0.5-15 μm and an oxide layer arranged directly above this with a layer thickness of from 0.05-3 μm, the non-bevelled, ring-shaped surfaces have a nitride diffusion layer with a layer thickness of from 5-300 μm and at least one of the non-bevelled ring-shaped surfaces does not have an oxide layer and does not have a nitride connecting layer, and the outer circumferential surface comprises the nitride diffusion layer and a chromium solid particle layer arranged above this with 0.1-30 vol.-% solid particles, relative to the total volume of the chromium solid particle layer.

The individual layers on the surfaces of the piston ring according to the invention in each case can cover a part of the surfaces of the piston ring or cover the surfaces completely. In particular, the layers (nitride diffusion layer, nitride connecting layer, oxide layer, chromium solid particle layer and chromium layer which does not contain any solid particles) in each case can cover 50-100%, preferably 80-100% of the respective surface.

The method for producing the piston ring according to the invention comprises the steps in which the base body of the piston ring (a) is heated to at least 300° C., preferably 500-800° C., in a combined nitriding-oxidation process under an atmosphere containing at least one nitrogen compound, then air is added to it and the piston ring is cooled in the presence of air, whereby a nitride diffusion layer, a nitride connecting layer arranged above this and an oxide layer arranged above this are produced on at least the first flank surface, the second flank surface and the outer circumferential surface of the piston ring, and (b) the piston ring is then introduced into an aqueous electrolyte which contains chromium in ion form and solid particles, and a chromium solid particle layer is deposited electrochemically onto at least the outer circumferential surface.

For example, nitrogen ($N_2$) and ammonia ($NH_3$) are suitable as nitrogen compounds. A mixture of ammonia, hydrogen ($H_2$) and nitrogen is preferably used. The electrochemical deposition of the chromium solid particle layer and the solid particle-free chromium layer can take place in a conventional manner known to a person skilled in the art.

In a preferred embodiment of the method, the oxide layer and optionally the nitride connecting layer on the outer circumferential surface and optionally the second flank surface can be removed again before step (b), in particular in the non-bevelled part of the surface. The oxide layer and optionally the nitride connecting layer on the second flank surface can alternatively also be removed only after the chrome-plating.

To produce the piston ring according to the invention which comprises a solid particle-free chromium layer on the external edges, in the further steps (c) the piston ring is introduced into an aqueous electrolyte which contains chromium in ion form and does not contain any solid particles, and a chromium layer which does not contain any solid particles is deposited electrochemically onto the outer circumferential surface and onto the area of the circumferential external edges and (d) the chromium layer on the outer circumferential surface is at least partially removed again mechanically.

The invention also relates to the use of the piston ring according to the invention in an internal combustion engine. For this, the piston ring according to the invention is introduced into a piston of an internal combustion engine, preferably as the first piston ring, i.e. positioned closest to the combustion chamber, in a manner known to a person skilled in the art.

It is understood that the features mentioned above and those yet to be explained below can be used not only in the stated combinations but also in other combinations or alone, without departing from the scope of the present invention.

BRIEF DESCRIPTION OF THE DRAWINGS

The invention is explained in more detail below by way of example with the help of the attached drawings, which also disclose features essential to the invention.

DETAILED DESCRIPTION OF THE DRAWINGS

Figure 1:
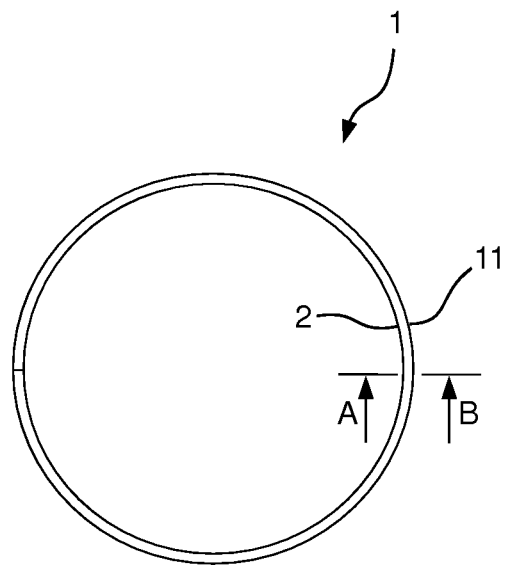
FIG. 1 shows an embodiment of the piston ring according to the invention.

In FIG. 1 an embodiment of the piston ring 1 according to the invention is represented, with an inner circumferential surface 2 and an outer circumferential surface 11. A and B show a sectional axis through the piston ring 1 for the subsequent FIGS. 2 and 3.

Figure 2:
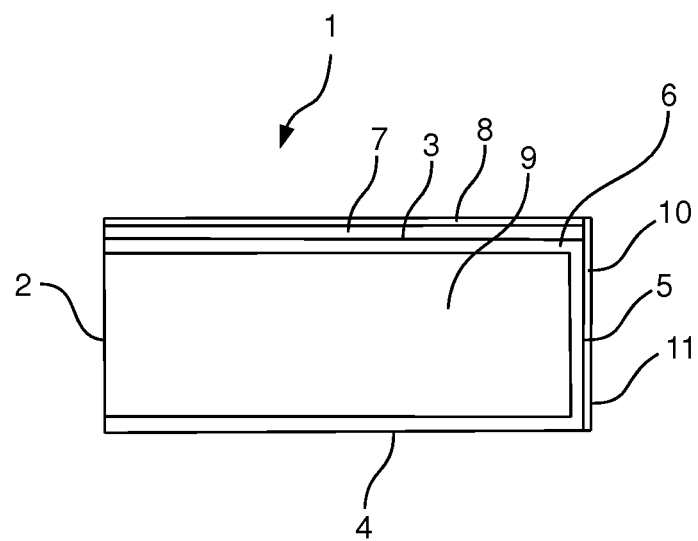
FIG. 2 shows a section through an embodiment of the piston ring according to the invention.

FIG. 2 shows a section through an embodiment of the piston ring 1 according to the invention, in the direction of the sectional axis A-B according to FIG. 1. The piston ring 1 consists of a metallic base body 9, which has an inner circumferential surface 2, a first flank surface 3, a second flank surface 4 and an outer circumferential surface 5. The first flank surface 3, the second flank surface 4 and the outer circumferential surface 5 have a nitride diffusion layer 6 and on the first flank surface 3 a nitride connecting layer 7 and an oxide layer 8 are arranged above the nitride diffusion layer 6. The layer thicknesses are only shown schematically and are not to scale. On the outer circumferential surface 5 a chromium solid particle layer 10 which forms the running surface 11 is shown on the nitride diffusion layer 6.

Figure 3:
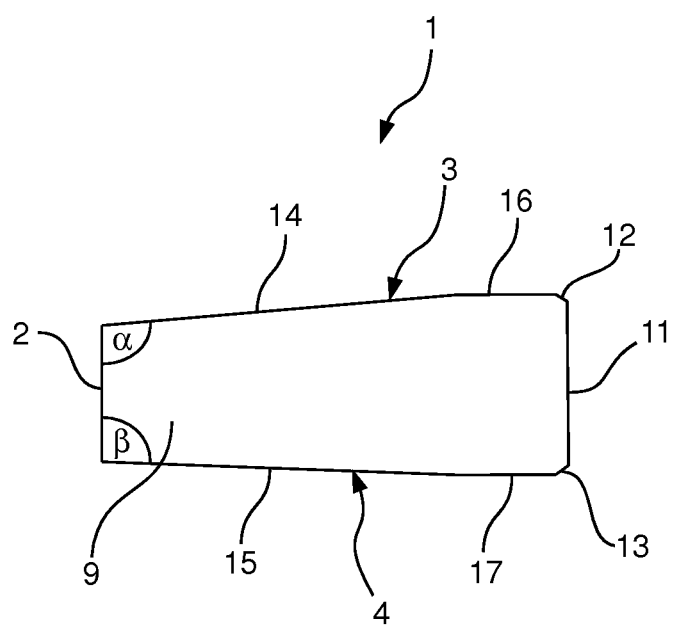
FIG. 3 shows a section through a further embodiment of the piston ring according to the invention.

FIG. 3 shows a section through a further embodiment of the piston ring 1 according to the invention, in which the first flank surface 3 and the second flank surface 4 of the base body 9 in each case have a bevelled ring-shaped surface 14, 15 and a non-bevelled ring-shaped surface 16, 17, and the outer circumferential surface 5 and the first flank surface 3 as well as the outer circumferential surface 5 and the second flank surface 4 in each case form a circumferential external edge 12, 13. The inner circumferential surface 2 and the bevelled surface 14 of the first flank surface 3 form the internal angle $\alpha$. The inner circumferential surface 2 and the bevelled surface 15 of the second flank surface 4 form the internal angle $\beta$.

The invention claimed is:

1. A piston ring for an internal combustion engine comprising a base body of chromium steel with more than 10% chromium by weight, the base body having an inner circumferential surface, a first flank surface, a second flank surface, and an outer circumferential surface, a nitride diffusion layer with a layer thickness between 5 to 300 μm extending over the first flank surface, the second flank surface and the outer circumferential surface, the first flank surface having a nitride connecting layer with a layer thickness between 0.5 to 15 μm on the nitride diffusion layer, and an Oxide layer with a layer thickness between 0.05 to 3 μm on the nitride connecting layer, the outer circumferential surface having a chromium solid particle layer on the nitride diffusion layer, the chromium solid particle layer containing between 0.1% to 30% solid particles by volume relative to the total volume of the chromium solid particle layer.

2. The piston ring of claim 1, wherein the piston ring presents a first circumferential external edge with an abrasion of from 0.05-0.5 mm between the outer circumferential surface and the first flank surface, and a second circumferential external edge with an abrasion of from 0.05-0.5 mm between the outer circumferential surface and the second flank surface, each of the first circumferential edge and the second circumferential edge comprising the nitride diffusion layer.

3. The piston ring of claim 2, wherein at least a portion of each circumferential external edge has a chromium solid particle layer containing between 0.1% to 30% solid particles by volume relative to the total volume of the chromium solid particle layer on the nitride diffusion layer, and a chromium layer which does not contain any solid particles on the chromium solid particle layer.

4. The piston ring of claim 1, wherein the first flank surface and the second flank surface each have a ring-shaped bevelled surface portion comprising at least 70% of the flank surface and disposed adjacent the inner circumferential surface, the first flank surface and the inner circumferential edge forming an internal angle $\alpha$, and the second flank surface and the inner circumferential edge forming an internal angle β, and wherein the internal angle α and the internal angle β are each 92°-115°, independently of each other.

5. The piston ring of claim 4, wherein each of the ring-shaped, bevelled surfaces makes up 70-95% of the flank surface, wherein each of the first flank surface and the second flank surface have a non-bevelled ring-Shaped surface disposed adjacent the ring-shaped, bevelled surface, and wherein at least one of the non-bevelled ring-shaped surfaces does not have an oxide layer and does not have a nitride connecting layer.

6. The piston ring of claim 5, wherein at least one of the non-bevelled ring-shaped surfaces has a nitride diffusion layer with a layer thickness <5 μm.

7. The piston ring of claim 5, wherein at least one of the non-bevelled ring-shaped surfaces does not have a nitride diffusion layer.

8. The piston ring, of claim 1, wherein the outer circumferential surface and the second flank surface do not have an oxide layer.

9. The piston ring of claim 1, wherein at least a portion of the second flank surface has an average peak-to-valley height <2 μm.

10. The piston ring of claim 1, wherein at least a portion of the first flank surface has an average peak-to-valley height >2.5 μm.

11. A method for producing a piston ring, the piston ring having a metallic base body with an inner circumferential surface, a first flank surface, a second flank surface, and an outer circumferential surface, the method comprising:
(a) heating the metallic base body to at least 300° C. in a combined nitriding-oxidation process under an atmosphere containing at least one nitrogen compound, adding air to the atmosphere, and cooling the piston ring in the presence of the air, whereby a nitride diffusion layer, a nitride connecting layer arranged above the nitride diffusion layer, and an oxide layer arranged above the nitride connecting layer are produced on at least the first flank surface, the second flank surface and the outer circumferential surface: and
(b) introducing the piston ring into an aqueous electrolyte which contains chromium in ion form and solid particles, whereby as chromium solid particle layer is deposited electrochemically onto at least the outer circumferential surface.

12. The method of claim 11, further comprising, between step (a) and (b), removing the oxide layer on the outer circumferential surface.

13. The method of claim 11, further comprising, between step (a) and (b), removing the nitride connecting layer on the outer circumferential surface.

14. The method of claim 11, further comprising, between step (a) and (b), removing the oxide layer on the second flank surface.

15. The method of claim 11, further comprising, between step (a) and (b), removing the nitride connecting layer on the second flank surface.

16. The method of claim 11, further comprising:
(c) introducing the piston ring into an aqueous electrolyte containing chromium in ion form and not containing any solid particles, whereby a chromium layer which does not contain any solid particles is deposited electrochemically onto the outer circumferential and
(d) at least partially removing the chromium layer on the outer circumferential surface mechanically.

* * * * *